(12) United States Patent
Ito

(10) Patent No.: US 9,077,829 B2
(45) Date of Patent: Jul. 7, 2015

(54) MANAGEMENT SYSTEM OF INFORMATION PROCESSING APPARATUS, INFORMATION PROCESSING APPARATUS, METHOD FOR CONTROLLING COMMUNICATION OF INFORMATION PROCESSING APPARATUS, AND STORAGE MEDIUM

(71) Applicant: CANON KABUSHIKI KAISHA, Tokyo (JP)

(72) Inventor: Keisuke Ito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/138,747

(22) Filed: Dec. 23, 2013

(65) Prior Publication Data

US 2014/0176979 A1    Jun. 26, 2014

(30) Foreign Application Priority Data

Dec. 26, 2012  (JP) ................. 2012-281976

(51) Int. Cl.
*G06F 3/12* (2006.01)
*H04N 1/00* (2006.01)

(52) U.S. Cl.
CPC ....... *H04N 1/00344* (2013.01); *H04N 1/00928* (2013.01); *H04N 1/00973* (2013.01); *H04N 2201/0075* (2013.01); *H04N 2201/0094* (2013.01)

(58) Field of Classification Search
CPC . H04N 1/00; H04N 1/00344; H04N 1/00928; H04N 1/00973; H04N 2201/0075; H04N 2201/0094
USPC ....................... 358/1.13, 1.15, 1.16
See application file for complete search history.

(56) References Cited

U.S. PATENT DOCUMENTS

| | | | | |
|---|---|---|---|---|
| 2003/0231338 A1* | 12/2003 | Haga | ............. | 358/1.15 |
| 2005/0141025 A1* | 6/2005 | Hanada | ............. | 358/1.15 |
| 2008/0028387 A1* | 1/2008 | Nakagawa et al. | ............. | 717/172 |
| 2008/0292353 A1* | 11/2008 | Sato | ............. | 399/82 |
| 2011/0035739 A1* | 2/2011 | Harada | ............. | 717/168 |
| 2012/0224207 A1* | 9/2012 | Sueshige | ............. | 358/1.13 |
| 2013/0198507 A1* | 8/2013 | Kasuya | ............. | 713/100 |

FOREIGN PATENT DOCUMENTS

| | | | | |
|---|---|---|---|---|
| JP | 2005-031898 | * | 2/2005 | ............. G06F 9/445 |
| JP | 2005-031898 A | | 2/2005 | |

\* cited by examiner

*Primary Examiner* — Benny Q Tieu
*Assistant Examiner* — Quyen V Ngo
(74) *Attorney, Agent, or Firm* — Canon U.S.A., Inc., IP Division

(57) ABSTRACT

There is provided an information processing apparatus capable of communicating with an external apparatus, and executing a predetermined function based on a setting value managed by the external apparatus.

5 Claims, 19 Drawing Sheets

FIG.3

| SETTING VALUE NAME | VALUE | RESTART FLAG | COPY | FAX | SCAN |
|---|---|---|---|---|---|
| SETTING VALUE A | 1 | TRUE | ○ | × | × |
| SETTING VALUE B | 2 | FALSE | × | ○ | × |
| SETTING VALUE C | 0 | TRUE | × | × | ○ |
| SETTING VALUE D | 1 | FALSE | ○ | × | ○ |

FIG.6

| SETTING VALUE NAME | VALUE | RESTART FLAG | COPY | FAX | SCAN |
|---|---|---|---|---|---|
| SETTING VALUE A | 3 | TRUE | ○ | × | × |
| SETTING VALUE B | 4 | FALSE | × | ○ | × |

FIG.8A

RESTART TO REFLECT
CHANGE IN SETTING VALUE?

[ YES ]   [ NO ]

FIG.8B

RESTART TO REFLECT
CHANGE IN SETTING VALUE?

[ YES ]   [ NO ]

FUNCTION WHICH CANNOT BE USED
UNLESS RESTART IS EXECUTED: COPY

FUNCTION WHICH CAN BE USED WITHOUT
EXECUTION OF RESTART: FAX, SCAN...

FIG.10

RESTART IS REQUIRED
TO USE THIS FUNCTION.
RESTART NOW?

| YES | NO |

FIG.11

THIS FUNCTION CANNOT BE USED
UNLESS RESTART IS EXECUTED.

FIG.12

| SETTING VALUE NAME | VALUE | RESTART FLAG | SHARED SETTING FLAG | COPY | FAX | SCAN |
|---|---|---|---|---|---|---|
| SETTING VALUE A | 1 | TRUE | FALSE | ○ | × | × |
| SETTING VALUE B | 2 | FALSE | TRUE | × | ○ | × |
| SETTING VALUE C | 0 | TRUE | FALSE | × | × | ○ |
| SETTING VALUE D | 1 | FALSE | TRUE | ○ | × | ○ |

FIG.14

| SETTING VALUE NAME | VALUE | RESTART FLAG | SHARED SETTING FLAG | COPY | FAX | SCAN |
|---|---|---|---|---|---|---|
| SETTING VALUE A | 1 | TRUE | FALSE | ○ | × | × |
| SETTING VALUE B | 2 | FALSE | TRUE | × | ○ | × |

FIG.16

| SETTING VALUE NAME | VALUE | RESTART FLAG | FORCED RESTART | COPY | FAX | SCAN |
|---|---|---|---|---|---|---|
| SETTING VALUE A | 1 | TRUE | FALSE | ○ | × | × |
| SETTING VALUE B | 2 | TRUE | TRUE | × | ○ | × |
| SETTING VALUE C | 0 | TRUE | FALSE | × | × | ○ |
| SETTING VALUE D | 1 | FALSE | TRUE | ○ | × | ○ |

FIG.18

| SETTING VALUE NAME | VALUE | RESTART FLAG | FORCED RESTART | COPY | FAX | SCAN |
|---|---|---|---|---|---|---|
| SETTING VALUE A | 1 | TRUE | FALSE | ○ | × | × |
| SETTING VALUE B | 2 | TRUE | TRUE | × | ○ | × |

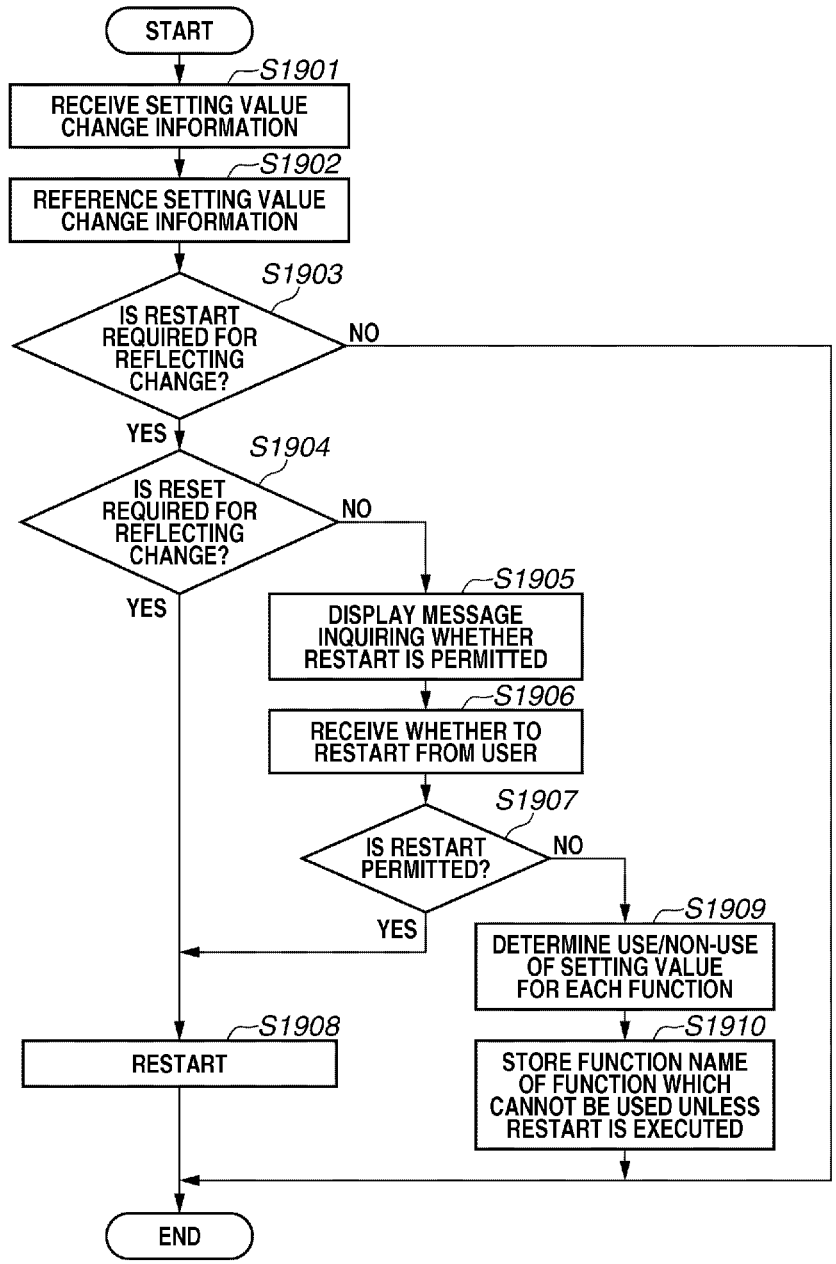

MANAGEMENT SYSTEM OF INFORMATION PROCESSING APPARATUS, INFORMATION PROCESSING APPARATUS, METHOD FOR CONTROLLING COMMUNICATION OF INFORMATION PROCESSING APPARATUS, AND STORAGE MEDIUM

BACKGROUND OF THE INVENTION

1. Field of the Invention

The present invention relates to an information processing apparatus management system for managing an information processing apparatus by communicating with a server apparatus, an information processing apparatus, a control method of the information processing apparatus, and a storage medium.

2. Description of the Related Art

In recent years, master data of setting values of information processing apparatuses is stored in a different information processing apparatus. For example, master data of setting values of a multifunction peripheral is stored in a server. Since the multifunction peripheral is connected to the server via a network, the setting values can be managed in a unified manner. When the value of the master data stored in the server is changed, the changed value is notified to the multifunction peripheral and the setting value of the multifunction peripheral is also changed.

Some of the setting values require restart of the multifunction peripheral if the change in the setting values needs to be reflected. However, if the multifunction peripheral is restarted regardless of its status when it receives a change notification of a setting value, which needs restart to reflect the change, from the server, the multifunction peripheral may be restarted while the user is using it. This results in inconvenience for the user. Under such circumstances, Japanese Patent Application Laid-Open No. 2005-031898 discusses a technique by which the information processing apparatus determines whether the restart is possible when it receives data which requires restart to reflect the data, and executes the restart only when it is possible.

However, according to the conventional technique, if the apparatus is not restarted when a change notification of a setting value that needs the restart is received, a function that references the setting value may be used in a state where the setting value is not changed. The function that needs reference to the setting value described above is, for example, a copy or a FAX function.

SUMMARY OF THE INVENTION

The present invention is directed to a technique capable of limiting execution of a function until the user confirms change information sent from a server apparatus and causes the change to be reflected.

Further features of the present invention will become apparent from the following description of exemplary embodiments with reference to the attached drawings.

BRIEF DESCRIPTION OF THE DRAWINGS

FIG. 3 is a table illustrating an example of master data stored in a hard disk drive (HDD) illustrated in FIG. 2.

FIG. 6 is a table illustrating change information of master data notified to the information processing apparatus by the management server apparatus.

FIGS. 8A and 8B illustrate examples of a user interface (UI) screen displayed on the information processing apparatus.

FIG. 10 illustrates an example of the UI screen displayed on the information processing apparatus.

FIG. 11 illustrates an example of the UI screen displayed on the information processing apparatus.

FIG. 12 is a table illustrating an example of setting information of the information processing apparatus managed by the management server apparatus.

FIG. 14 is a table illustrating an example of setting information of the information processing apparatus managed by the management server apparatus.

FIG. 16 is a table illustrating an example of setting information of the information processing apparatus managed by the management server apparatus.

FIG. 18 is a table illustrating an example of setting information of the information processing apparatus managed by the management server apparatus.

FIG. 19 is a flowchart illustrating a control method of the information processing apparatus.

DESCRIPTION OF THE EMBODIMENTS

Various exemplary embodiments, features, and aspects of the invention will be described in detail below with reference to the drawings.

<System Configuration>

Figure 1:
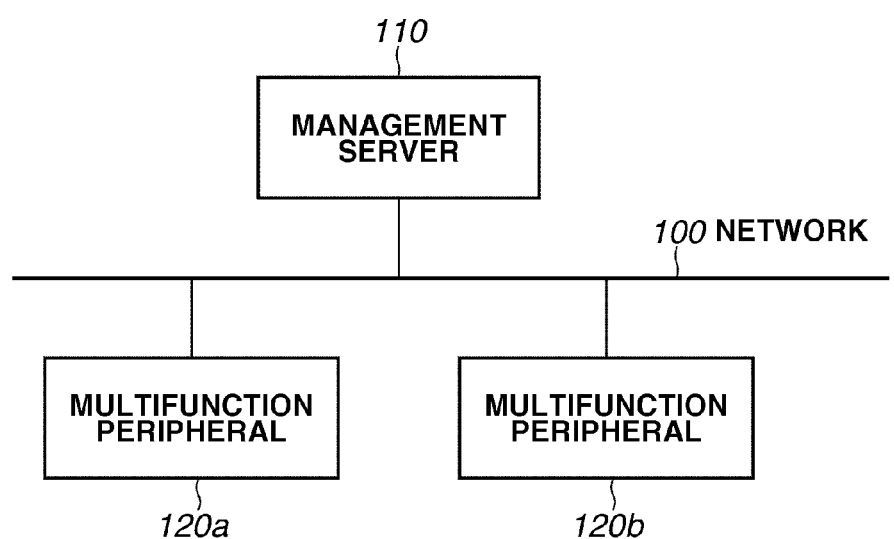
FIG. 1 is a block diagram illustrating a management system in which a management server communicates with and controls information processing apparatuses.

FIG. 1 is a block diagram illustrating a management system in which a management server apparatus communicates with and manages information processing apparatuses according to a first exemplary embodiment of the present exemplary embodiment. According to the present exemplary embodiment, an image forming apparatus, such as a multifunction peripheral executable of multifunctional image processing, is described as an example of the information processing apparatus.

In FIG. 1, a setting value management server (hereinafter referred to as a management server) 110, a multifunction peripheral 120a, and a multifunction peripheral 120b are connected to a network 100. The management server 110 manages master data of the setting values corresponding to processing of each function of the multifunction peripheral 120a and the multifunction peripheral 120b. If master data of a setting value is changed, information of the change (change information) of the setting value is notified to the multifunction peripheral 120a and the multifunction peripheral 120b via the network 100.

The multifunction peripheral 120a and the multifunction peripheral 120b can realize processing of various functions including a copy function and facsimile function, and store setting values to be used when they execute the processing of the functions therein. When the multifunction peripheral 120a and the multifunction peripheral 120b receive change information of the master data of the setting values from the management server 110, they update their setting values. Detailed descriptions of the management server 110, the multifunction peripheral 120a and the multifunction peripheral 120b will be given below.

Figure 2:
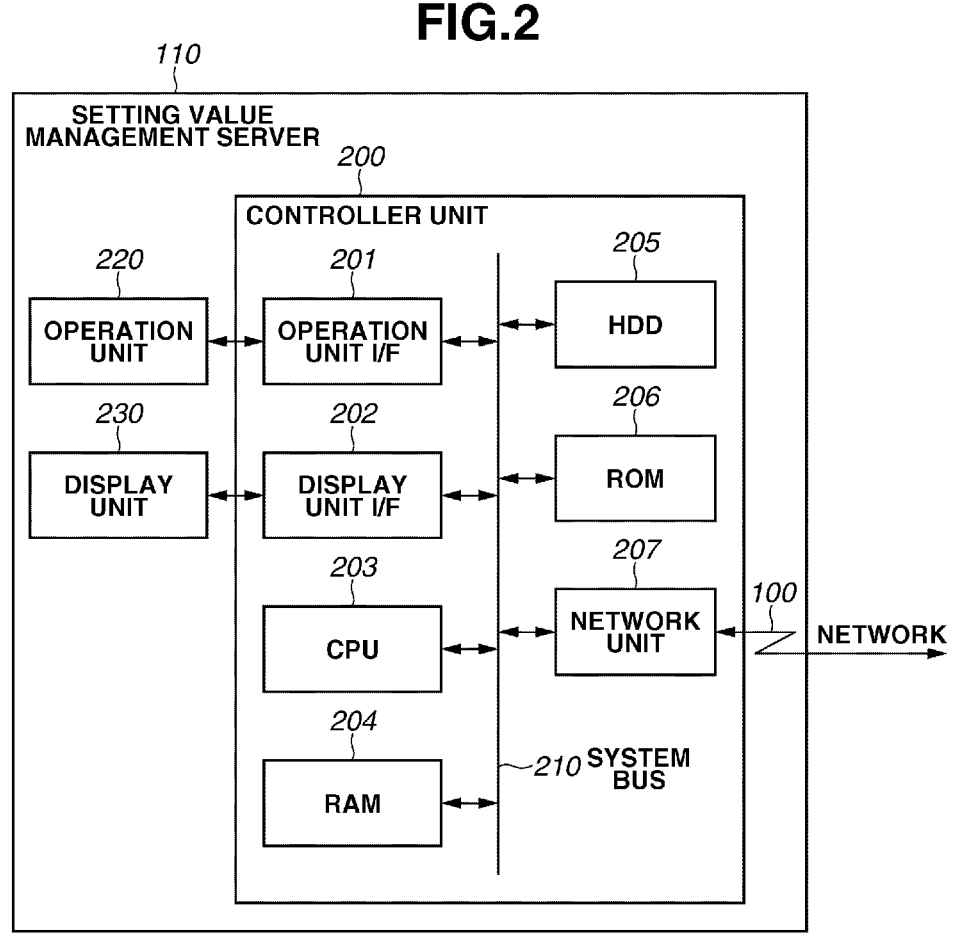
FIG. 2 is a block diagram illustrating a configuration of a management server illustrated in FIG. 1.

FIG. 2 is a block diagram illustrating a configuration of the management server 110 illustrated in FIG. 1.

In FIG. 2, the management server 110 includes a controller unit 200, an operation unit 220, and a display unit 230. The controller unit 200 includes a central processing unit (CPU) 203. The CPU 203 starts an operating system (OS) by a boot program stored in a read-only memory (ROM) 206.

The CPU 203 executes an application program stored in a HDD 205 on the OS. The CPU 203 executes various types of processing by executing the application programs. A random access memory (RAM) 204 is used as a working area of the CPU 203. The above-described application programs and the master data of the setting values of the multifunction peripheral 120a and the multifunction peripheral 120b are stored in the HDD 205.

FIG. 3 is a table illustrating an example of the master data stored in the HDD 205 illustrated in FIG. 2. The master data includes a value, a restart flag, and a function name. The master data includes these elements for each setting value. The restart flag indicates whether the restart of the multifunction peripheral is necessary when the change in the setting value is to be reflected. The function name is a name of the function to be used to reference the setting value. The elements are linked to one another and managed. According to the example illustrated in FIG. 3, one setting value is used by a plurality of functions.

In addition to the ROM 206 and the RAM 204, an operation unit I/F 201, a display unit I/F 202, and a network unit 207 are connected to the CPU 203 via a system bus 210. The operation unit I/F 201 is an interface to the operation unit 220 which includes a mouse and a keyboard. Information input by the user via the operation unit 220 is transmitted to the CPU 203.

To the display unit 230, the display unit I/F 202 outputs image data to be displayed on the display unit 230. The network unit 207 is connected to the network 100. Via the network 100, the network unit 207 performs input/output of information with each apparatus on the network 100.

Figure 4:
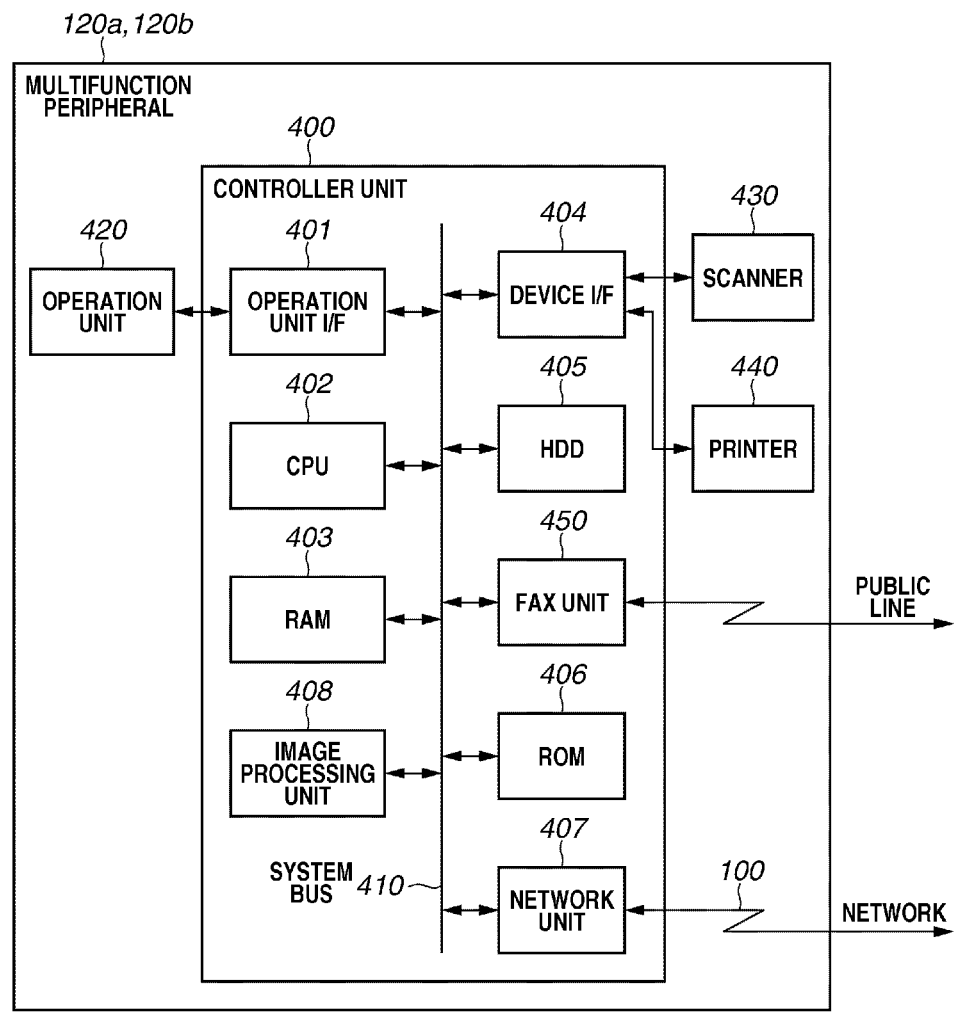
FIG. 4 is a block diagram illustrating a configuration of a multifunction peripheral illustrated in FIG. 1.

FIG. 4 is a block diagram illustrating a configuration of the multifunction peripheral 120a and the multifunction peripheral 120b illustrated in FIG. 1. According to the present exemplary embodiment, a multifunction peripheral is used as an example of an execution unit. Further, predetermined function processing executable by the execution unit includes scan function processing, print function processing, copy function processing, and facsimile communication function processing.

In FIG. 4, each of the multifunction peripheral 120a and the multifunction peripheral 120b includes a controller unit 400, an operation unit 420, a scanner 430, a printer 440, and a FAX unit 450. In addition to the operation unit 420, the scanner 430 (i.e., image input device) and the printer 440 (i.e., image output device) are connected to the controller unit 400. The FAX unit 450 can execute facsimile transmission/reception processing via a public line.

The controller unit 400 includes a CPU 402. The CPU 402 boots the OS by a boot program stored in a ROM 406.

Then, the CPU 402 executes an application program stored in a HDD 405 on the OS and performs various types of processing. A RAM 403 is used as a work area of the CPU 402.

In addition to providing a work area, the RAM 403 also provides an image memory area used for temporarily storing image data and an area used for storing names of functions which are not allowed to use without performing restarting.

The above-described application program, image data, and various setting values are stored in the HDD 405. As for the setting values, only a value is stored for each setting value. In addition to the ROM 406 and the RAM 403, an operation unit I/F 401, a device I/F 404, a network unit 407, and an image processing unit 408 are connected to the CPU 402 via a system bus 410. The operation unit I/F 401 is an interface with the operation unit 420 which includes a touch panel. The operation unit I/F 401 is used when image data to be displayed on the operation unit 420 is output to the operation unit 420.

Further, the operation unit I/F 401 transfers information input by the user via the operation unit 420 to the CPU 402. The scanner 430 and the printer 440 are connected to the device I/F 404, and the device I/F 404 performs synchronous/asynchronous conversion of image data.

The network unit 407 is connected to the network 100. The network unit 407 performs input/output of information between the controller unit 400 and each apparatus on the network 100 via the network 100. The image processing unit 408 performs processing of images input from the scanner 430 and processing of images to be output to the printer 440. Further, the image processing unit 408 performs image rotation, image compression, resolution conversion, color space conversion, and gradation conversion.

[Notification Processing of Change Information]

Figure 5:
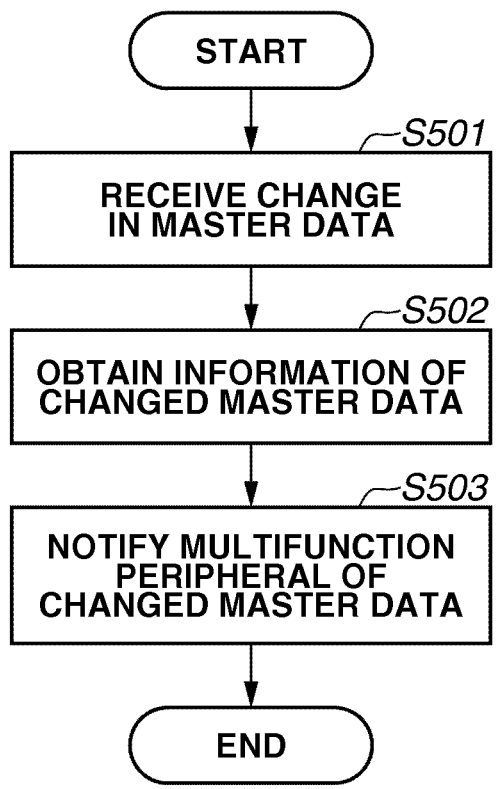
FIG. 5 is a flowchart illustrating a control method of the management server apparatus.

FIG. 5 is a flowchart illustrating a control method of the management server apparatus according to the present exemplary embodiment. The flowchart illustrates an example of processing executed by the CPU 203 from when the management server 110 illustrated in FIG. 1 accepts the change in the master data of the setting values for the multifunction peripheral 120a and the multifunction peripheral 120b to when the management server 110 notifies the multifunction peripheral 120a and the multifunction peripheral 120b of the change information. A case where the value of a setting value A and a setting value B in FIG. 3 are changed to "3" and "4", respectively, will be used in describing the flowchart. Further, each step of the flowchart is realized by the CPU 203 executing a control program stored in the HDD 205 or the ROM 206.

In step S501, the CPU 203 receives a change in the master data input from the operation unit 220. In the above-described case, the CPU 203 receives the change of the setting value A to "3" and the setting value B to "4".

In step S502, for each setting value having the master data being changed, the CPU 203 obtains a restart flag and a name of the function which references the setting value. In the case described above, by referencing the table in FIG. 3, the CPU 203 obtains "TRUE" as the restart flag of the setting value A and "COPY" as the function name. Further, the CPU 203 obtains "FALSE" as the restart flag of the setting value B and "FAX" as the function name.

In step S503, for each setting value changed in the master data, the CPU 203 notifies the multifunction peripheral 120a and the multifunction peripheral 120b of the value after the change, the restart flag, and the name of the function which references the setting value, via the network unit 207. According to the example described above, setting value change information such as the information illustrated in FIG. 6 is notified to the multifunction peripheral 120a and the multifunction peripheral 120b, and then the processing ends.

Figure 7:
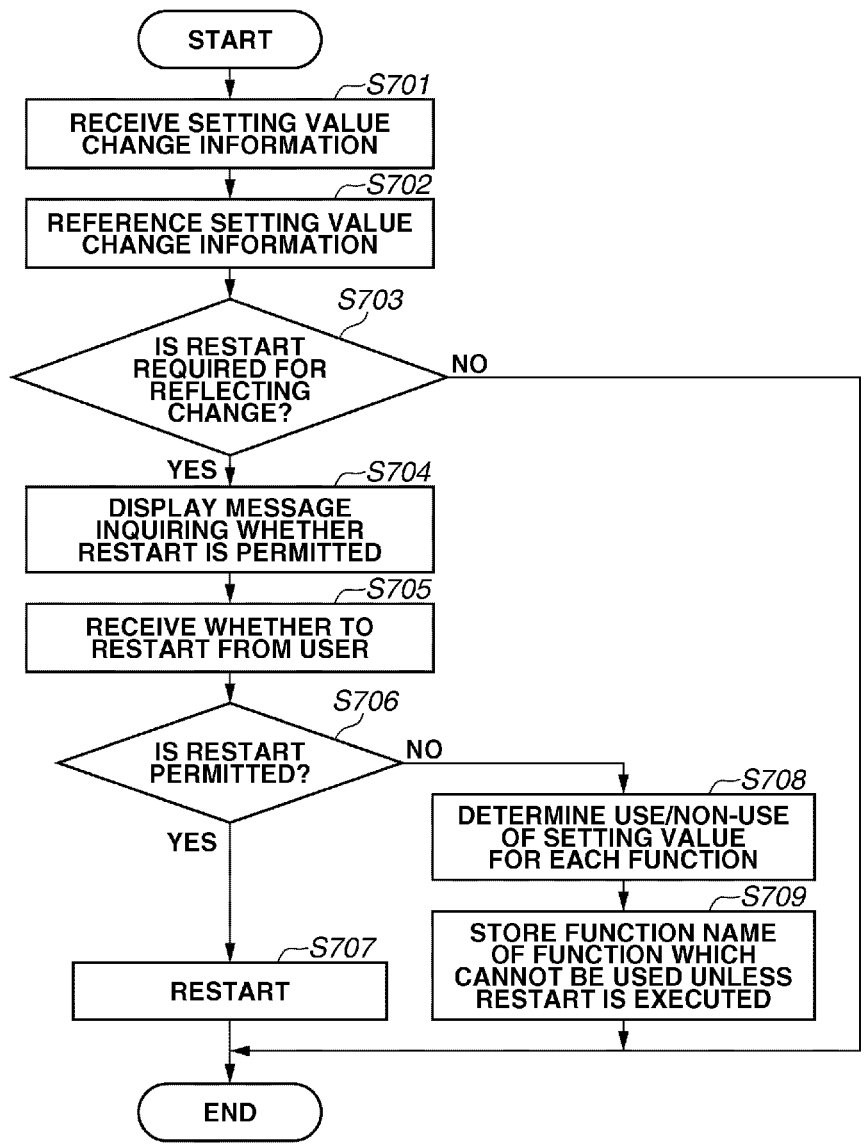
FIG. 7 is a flowchart illustrating a control method of the information processing apparatus.

FIG. 7 is a flowchart illustrating a control method of the information processing apparatus according to the present exemplary embodiment. The flowchart illustrates the processing performed when the multifunction peripheral 120a and the multifunction peripheral 120b receive change information of the master data from the management server 110. A case where setting value change information, such as the information illustrated in FIG. 6, is transferred from the management server 110 will be used in describing the flowchart. Each step is realized by the CPU 402 executing a control program stored in the ROM 406 or the HDD 405 of each of the multifunction peripheral 120a and the multifunction peripheral 120b. According to the flowchart, if the user permits the restart of the apparatus via the displayed screen, the multifunction peripheral is restarted. On the other hand, if the user does not permit the restart of the apparatus, the use of the function of which the use request is received will be prohibited.

In step S701, the CPU 402 receives the change information of the master data from the management server 110 via the network unit 407. The change information includes the setting value after the change, the restart flag, and the name of the function which references the setting value.

In step S702, the CPU 402 references the change information of the master data received in step S701. In step S703, the CPU 402 performs first determination processing and determines whether the restart is necessary in reflecting the update. In performing the first determination processing, the CPU 402 searches for a changed setting value with a restart flag of "TRUE" out of the changed setting values. If such a setting value exists, the CPU 402 determines that the restart is necessary (YES in step S703), and the processing proceeds to step S704. If the CPU 402 determines that the restart is not necessary (NO in step S703), the processing ends.

According to the example described above, since the restart flag of the setting value A is "TRUE", the CPU 402 determines that the restart is necessary (YES in step S703), and the processing proceeds to step S704.

If the CPU 402 determines that only the change notification of the setting value B has been transmitted, since the restart flag of the setting value B is "FALSE", the CPU 402 determines that the restart is unnecessary (NO in step S703), and the processing ends.

In step S704, the CPU 402 displays a message inquiring the user whether to permit the restart via a UI screen illustrated in FIG. 8A on the operation unit 420. In addition to a message inquiring the user whether to permit the restart of the apparatus, a list of functions which cannot be used unless the apparatus is restarted and a list of functions which can be used without restarting the apparatus can be displayed on the UI screen. Such an example is illustrated in FIG. 8B.

In displaying such a list, the CPU 402 displays the function which references the setting value with the restart flag of "TRUE" as the function which cannot be used. The CPU 402 displays other functions as the functions which can be used.

According to the example described above, since the restart flag of the setting value A is "TRUE" and the function that references the setting value A is the copy function, as illustrated in FIG. 8B, the CPU 402 displays "COPY" as the name of the function which cannot be used. In step S705, the CPU 402 receives the result of the determination (whether to permit the restart) made by the user. The user determines whether to permit the restart by pressing either a "YES" button or a "NO" button.

In step S706, the CPU 402 determines whether the restart has been permitted by the user in step S705 in order to perform first control processing. If the CPU 402 determines that the restart has been permitted (YES in step S706), the processing proceeds to step S707. In step S707, the CPU 402 restarts the multifunction peripheral 120a and the multifunction peripheral 120b. On the other hand, if the CPU 402 determines that the restart has not been permitted (NO in step S706), the processing proceeds to step S708. In step S708, with respect to the setting value having "TRUE" as the restart flag, the CPU 402 determines the use/not-use of the setting value for each function.

In step S709, the CPU 402 stores the function determined as using the setting value in step S708 in the RAM 403. More specifically, the CPU 402 stores the name of the function as identification information. In the case of the above-described example, the copy function is stored as the function in the RAM 403.

Figure 9:
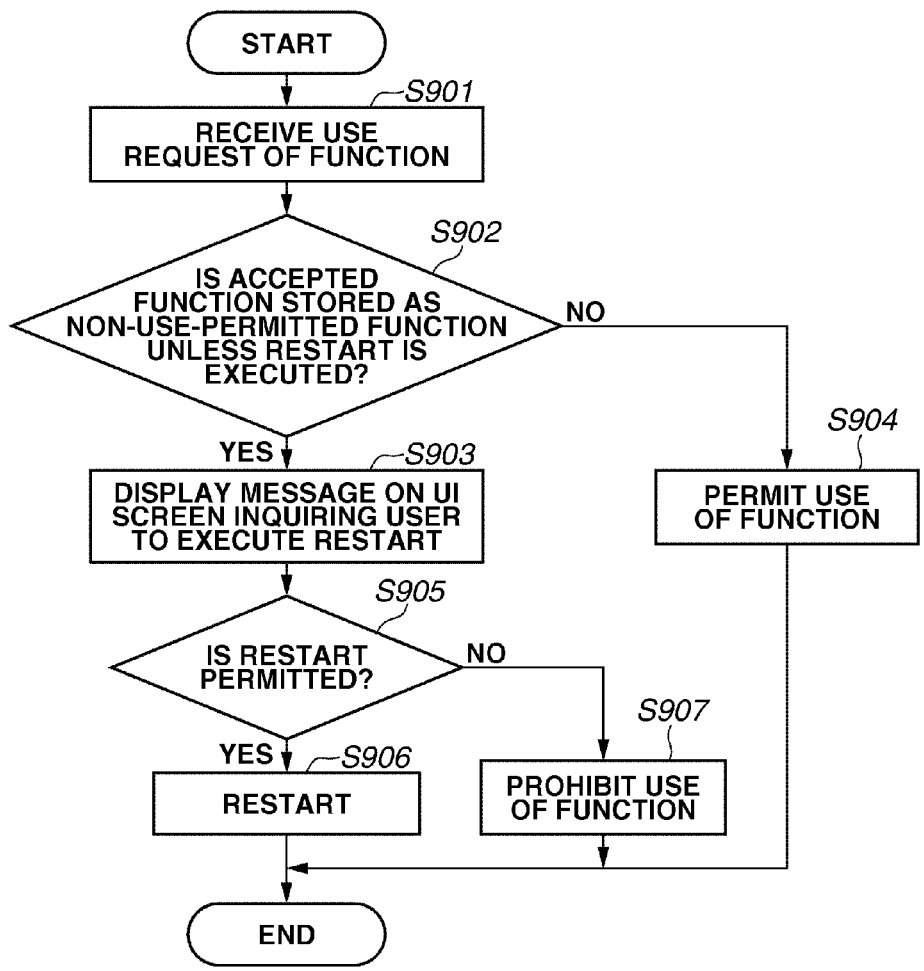
FIG. 9 is a flowchart illustrating a control method of the information processing apparatus.

FIG. 9 is a flowchart illustrating a control method of the information processing apparatus according to the present exemplary embodiment. The flowchart illustrates the processing which is performed when the multifunction peripheral 120a and the multifunction peripheral 120b receive a function use request. A case where the multifunction peripherals 120a and the multifunction peripheral 120b have not restarted although the setting value change information, such as the information illustrated in FIG. 6, has been transmitted from the management server 110, and the use request of the copy function and the FAX function has been received under such circumstances, will be described. Each step is realized by the CPU 402 executing a control program stored in the ROM 406 or the HDD 405 of each of the multifunction peripheral 120a and the multifunction peripheral 120b.

In step S901, the CPU 402 receives the use request of each of the copy and FAX functions based on the user instruction from the operation unit 420. In step S902, the CPU 402 performs first determining processing to determine whether the function associated with the use request that the CPU 402 has received in step S901 can be used. More precisely, the CPU 402 determines whether the function is stored in the RAM 403 as a function which is not given the use permission unless the apparatus is restarted. If the CPU 402 determines that the function is stored as a function which is not given the use permission unless the apparatus is restarted (YES in step S902), the processing proceeds to step S903. If the CPU 402 determines that the function is not stored as a function which is not given the use permission unless the apparatus is restarted (NO in step S902), the processing proceeds to step S904.

According to the example described above, regarding the copy function, since it is stored as a function not permitted to use unless the restart is executed (YES in step S902), the processing proceeds to step S903. Regarding the FAX function, since it is not stored as a function not permitted to use unless the restart is executed (NO in step S902), the processing proceeds to step S904.

In step S903, by using the UI screen illustrated in FIG. 10, in order to perform first display processing, the CPU 402 displays a message inquiring the user whether to restart the apparatus on the operation unit 420. The user can responds to the message by selecting either a YES button or a NO button.

In step S904, the CPU 402 permits the use of the function. In step S905, the CPU 402 determines whether the user has permitted the restart. If the CPU 402 determines that the user has permitted the restart (YES in step S905), the processing proceeds to step S906. If the CPU 402 determines that the user has not permitted the restart (NO in step S905), the processing proceeds to step S907. In step S906, the CPU 402 restarts the multifunction peripheral 120a and the multifunction peripheral 120b, and then the processing ends. In step S907, the CPU 402 display a message on the UI screen illustrated in FIG. 11, and informs the user that the function is limited. Further, the CPU 402 prohibits the use of function, and then the processing ends.

According to the present exemplary embodiment, regarding a setting value which requires restart of the apparatus to reflect a change in the master data, if the change in the master data is not reflected at the time when the setting value is to be actually used, the use of the function that references the setting value can be prohibited.

According to the first exemplary embodiment, regarding the setting values of the multifunction peripheral 120a and the multifunction peripheral 120b, the setting value which can be shared among a plurality of multifunction peripherals and the setting value which is unique to each multifunction peripheral are not distinguished.

Regarding the setting value which is shared among a plurality of multifunction peripherals, unless the reflection of the latest change in the master data is guaranteed at the time when the function that references the value is used, the operation of the multifunction peripherals when a job is executed and the output result will be different among the multifunction peripherals which share the setting value. As for the setting value which is unique to each multifunction peripheral, since the above-described problem does not occur, the importance of guaranteeing whether the change in the master data is reflected at the time when the function is used is lower compared to the setting value shared among a plurality of multifunction peripherals.

Therefore, according to a second exemplary embodiment, regarding a setting value shared among a plurality of multifunction peripherals, if a change in the master data is not reflected at the time when the function that references the setting value is to be actually used, the use of the function will be prohibited.

In the description below, components similar to those in the first exemplary embodiment are denoted by the same reference numerals and their description is not repeated.

FIG. 12 is a table illustrating an example of the master data managed by the management server 110 illustrated in FIG. 1. The master data in FIG. 12 includes a value, a restart flag, a common setting flag, and a function name. The common setting flag indicates whether the value of the setting value is shared among the plurality of multifunction peripherals. The function name is a name of the function which references the setting value. These elements are linked to one another and managed.

Figure 13:
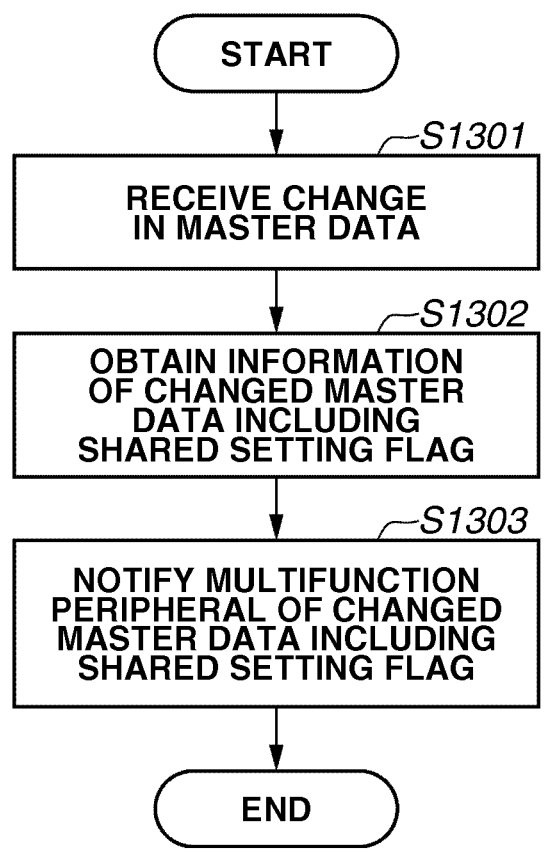
FIG. 13 is a flowchart illustrating a control method of the management server apparatus.

FIG. 13 is a flowchart illustrating a control method of the management server apparatus according to the present exemplary embodiment. The flowchart illustrates an example of master data processing performed by the management server 110. A case where the value of the setting value A and the setting value B in FIG. 12 are changed to "5" and "6", respectively, will be used in describing the flowchart.

In step S1302, for each setting value changed in the master data, the CPU 203 obtains a restart flag, a name of the function which references the setting value, and a common setting flag. In the case described above, by referencing the table in FIG. 12, the CPU 203 obtains "TRUE" as the restart flag of the setting value A, "COPY" as the function name, and "FALSE" as the common setting flag. Further, the CPU 203 obtains "FALSE" as the restart flag of the setting value B, "FAX" as the function name, and "TRUE" as the common setting flag.

In step S1303, for each setting value changed in the master data, the CPU 203 notifies the multifunction peripheral 120a and the multifunction peripheral 120b of the value after the change, the restart flag, the name of the function which references the setting value, via the network unit 207, and the common setting flag. According to the example described above, setting value change information such as the information illustrated in FIG. 14 is notified to the multifunction peripheral 120a and the multifunction peripheral 120b, and then the processing ends.

Figure 15:
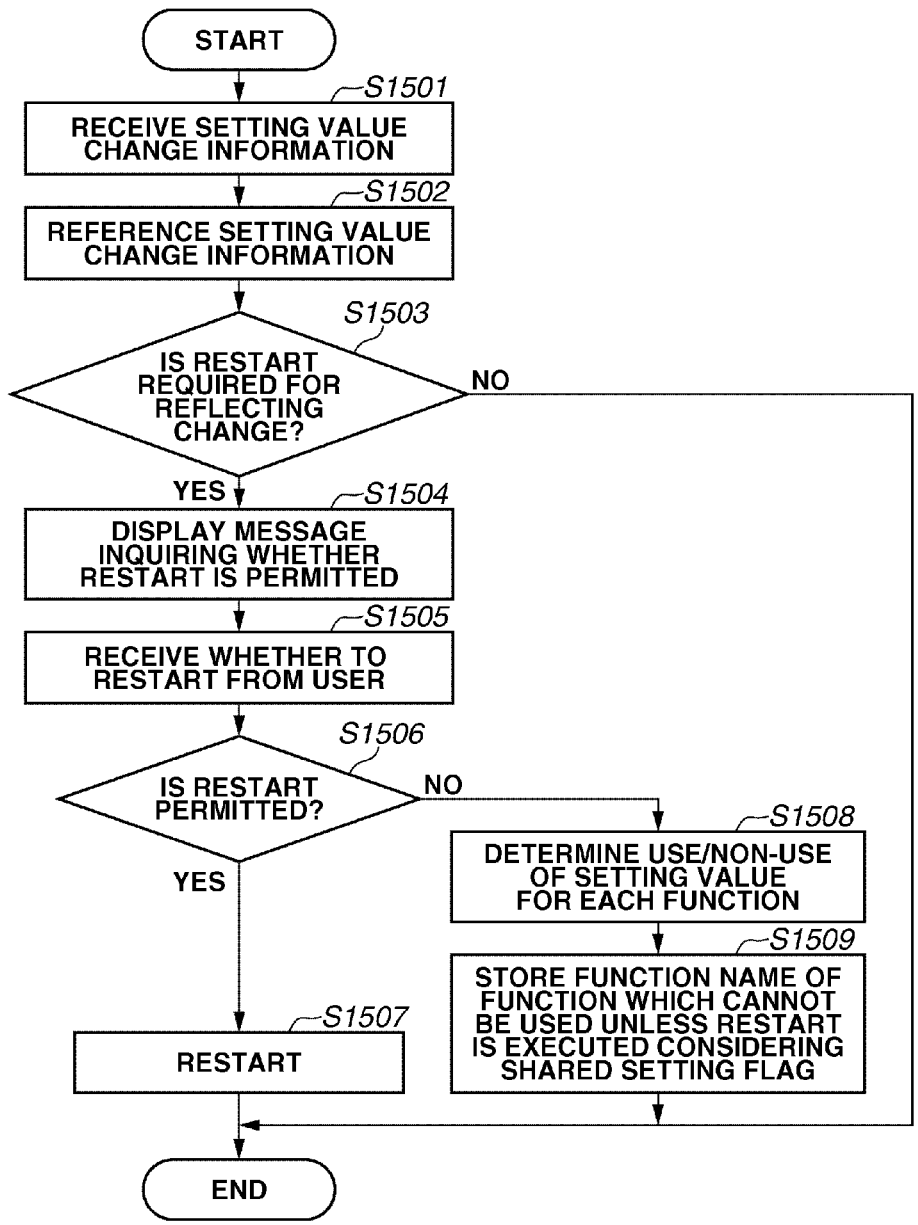
FIG. 15 is a flowchart illustrating a control method of the information processing apparatus.

FIG. 15 is a flowchart illustrating a control method of the information processing apparatus according to the present exemplary embodiment. The flowchart illustrates the processing which is performed when the multifunction peripheral 120a and the multifunction peripheral 120b receive change information of the master data from the management server 110. A case where setting value change information, such as the information illustrated in FIG. 14, is transferred from the management server 110 will be used in describing the flowchart. Each step is realized by the CPU 402 executing a control program stored in the ROM 406 or the HDD 405 of each of the multifunction peripheral 120a and the multifunction peripheral 120b.

In step S1501, the CPU 402 receives the change information of the master data from the management server 110 via the network unit 407. The change information includes the setting value after the change, the restart flag, the name of the function which references the setting value, and the common setting flag. In step S1503, the CPU 402 determines the state of the restart flag in order to perform second determination processing. In step S1504, the CPU 402 displays the result of the determination in order to perform second display processing.

In step S1509, the CPU 402 stores the function name of the function not permitted to use unless the restart is executed, in the RAM 403. A function that references a setting value having "TRUE" as the restart flag as well as the common setting flag is stored as the function name of the function not permitted to use unless the restart is executed. According to the example described above, since the restart flag is "TRUE" and the common setting flag is "TRUE" regarding the setting value B in FIG. 14, the function is stored as a function not permitted to use unless the restart is executed. On the other hand, the CPU 402 executes second control that corresponds to the processing performed in steps S1506 to 1509 and controls the restart.

According to the present exemplary embodiment, regarding a setting value shared among a plurality of multifunction peripherals, the reflection of the change in the master data is guaranteed at the time when the function that actually references the value is used.

According to the first and the second exemplary embodiments described above, only the setting values linked to the copy and FAX functions are described out of the setting values of the multifunction peripheral 120a and the multifunction peripheral 120b.

However, in addition to such values, there is a setting value not linked to a particular function such as a setting value related to network. Since such a value is used via a plurality of routes, whether the latest value is used for the setting value cannot be guaranteed only by prohibiting the use of a particular function.

Therefore, according to a third exemplary embodiment of the present invention, when the multifunction peripheral 120a and the multifunction peripheral 120b receive change information, regarding a setting value not linked to a particular function, the multifunction peripherals are reset regardless of whether the restart is permitted by the user or not.

In the description below, components similar to those in the first exemplary embodiment are denoted by the same reference numerals and their description is not repeated. The management server 110 manages the master data according to a table illustrated in FIG. 16. The master data includes a value, a restart flag, a forced restart flag, and a function name. The forced restart flag indicates whether the multifunction peripherals need to be forced restart when the change of the setting value is to be reflected. The function name is a name of the function which references the setting value. These elements are linked to one another and managed.

Figure 17:
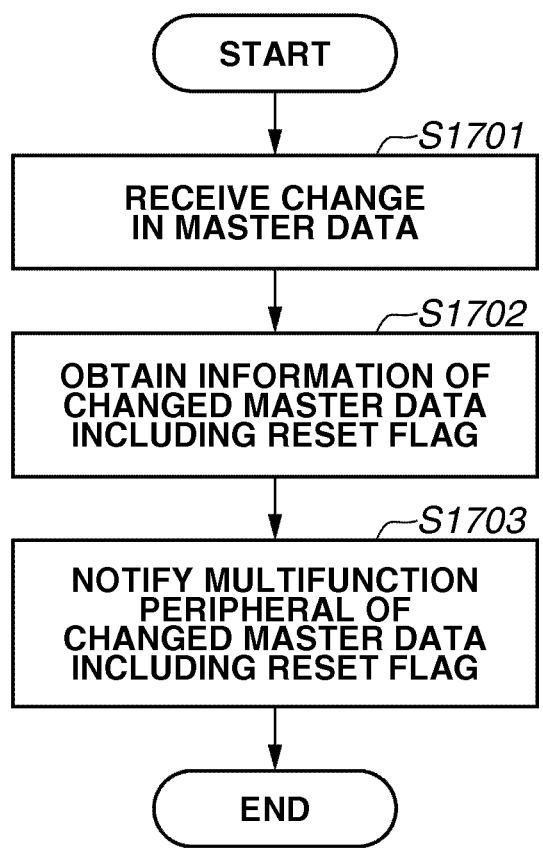
FIG. 17 is a flowchart illustrating a control method of the management server apparatus.

FIG. 17 is a flowchart illustrating a control method of the management server apparatus according to the present exemplary embodiment. The flowchart illustrates an example of processing executed by the CPU 203 from when the management server 110 illustrated in FIG. 1 receives the change in the master data of the setting values of the multifunction peripheral 120a and the multifunction peripheral 120b to when the management server 110 notifies the multifunction peripheral 120a and the multifunction peripheral 120b of the change information. A case where the value of a setting value A and a setting value B in FIG. 16 are changed to "7" and "8", respectively, will be used in describing the flowchart. Further, each step of the flowchart is realized by the CPU 203 executing a control program stored in the HDD 205 or the ROM 206.

In step S1702, for each setting value changed in the master data, the CPU 203 obtains a restart flag, a forced restart flag, and a name of the function which references the setting value. In the case described above, by referencing the table in FIG. 16, the CPU 203 obtains "TRUE" as the restart flag of the setting value A, "FALSE" as the forced restart flag, and "COPY" as the function name. Further, the CPU 203 obtains "FALSE" as the restart flag of the setting value B, "TRUE" as the forced restart flag, and no corresponding function name. In step S1703, for each setting value changed in the master data, the CPU 203 notifies the multifunction peripheral 120a and the multifunction peripheral 120b of the value after the change, the restart flag, the forced restart flag, and the name of the function which references the setting value, via the network unit 207. According to the example described above, setting value change information illustrated in FIG. 18 is notified to the multifunction peripheral 120a and the multifunction peripheral 120b.

FIG. 19 is a flowchart illustrating a control method of the information processing apparatus according to the present exemplary embodiment. The flowchart illustrates the processing which is performed when the multifunction peripheral 120a and the multifunction peripheral 120b receive change information of the master data from the management server 110. A case where setting value change information, such as the information illustrated in FIG. 18, is transmitted from the management server 110 will be used in describing the flowchart. Each step is realized by the CPU 402 executing a control program stored in the ROM 406 or the HDD 405 of each of the multifunction peripheral 120a and the multifunction peripheral 120b.

In step S1901, the CPU 402 receives the change information of the master data from the management server 110 via the network unit 407. The change information is information of the setting value changed in the master data and includes the setting value after the change, the restart flag, the forced restart flag, and the name of the function which references the setting value.

In step S1904, the CPU 402 determines whether the reset is required in order to deal with third determination processing.

More specifically, in step S1904, the CPU 402 searches for a setting value having "TRUE" as the forced restart flag out of the setting values received in step S1901. If such a setting value exists, the CPU 402 determines that the reset is required. If the CPU 402 determines that the reset is required (YES in step S1904), in order to execute processing that corresponds to third control, the processing proceeds to step S1908. On the other hand, if the CPU 402 determines that the reset is not required (NO in step S1904), in order to perform third display processing, the processing proceeds to step S1905.

However, if the multifunction peripheral 120a and the multifunction peripheral 120b are executing a job, the processing proceeds to step S1908 after the job is finished.

In the case of the example described above, since the forced restart flag of the setting value B is TRUE, the CPU 402 determines that the forced restart is required, and the processing proceeds to step S1908. If the change notification of only the setting value A is received, since the forced restart flag of the setting value A is "FALSE", the CPU 402 determines that the forced restart is not required, and the processing proceeds to step S1905.

According to the present exemplary embodiment, even if a setting value not linked to a particular function is included in the setting values of the multifunction peripheral 120a and the multifunction peripheral 120b, the change in the master data is reflected is guaranteed at the time when the value is actually used.

According to the first exemplary embodiment described above, the copy and the FAX functions are exemplified as the functions linked to each setting value as a function that references each setting value. The setting values include setting values which are referenced only when a sub function of such functions is used. For example, regarding the setting value used for detailed setting such as designating whether to permit multi-address transmission of FAX, the setting value is referenced only when the multi-address transmission function in the FAX functions is used.

Thus, according to the present exemplary embodiment, as a function that references each setting value, a function with a smaller function unit than the copy and the FAX functions, can be designated. Since the processing steps of the present exemplary embodiment are similar to that described according to the first exemplary embodiment, their description is not repeated. According to the present exemplary embodiment, the CPU 402 determines a detailed setting value as fourth determination processing and performs fourth display processing inquiring the user whether to restart the apparatus. Then, the CPU 402 determines whether the restart has been permitted, and performs fourth control.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-281976 filed Dec. 26, 2012, which is hereby incorporated by reference herein in its entirety.

What is claimed is:

1. An information processing apparatus capable of communicating with an external apparatus, and executing a predetermined function based on a setting value managed by the external apparatus, the information processing apparatus comprising:
    a receiving unit configured to receive a use request of the predetermined function from a user;
    an acquisition unit configured to acquire information indicating a changed content of the setting value from the external apparatus when the external apparatus has changed the setting value; and
    a control unit configured to, if the receiving unit has received a use request of a function corresponding to the information in a state where the information processing apparatus has not been restarted after the acquisition unit has received the information, display a screen for prompting a restart of the information processing apparatus,
    wherein the control unit prohibits use of the function corresponding to the information if the restart of the information processing apparatus is not permitted after displaying the screen.

2. The information processing apparatus according to claim 1, wherein the control unit restarts the information processing apparatus if the restart of the information processing apparatus is permitted after displaying the screen.

3. The information processing apparatus according to claim 1, wherein the control unit permits use of the function corresponding to the information if the receiving unit has received a use request of a function different from the function corresponding to the information.

4. A control method of an information processing apparatus capable of communicating with an external apparatus, and executing a predetermined function based on a setting value managed by the external apparatus, the method comprising:
    receiving a use request of a predetermined function from a user;
    acquiring information indicating a changed content of the setting value from the external apparatus when the external apparatus has changed the setting value; and
    performing control, if the use request of the function corresponding to the information has been received in a state where the information processing apparatus has not been restarted after acquiring the information, to display a screen for prompting a restart of the information processing apparatus,
    wherein performing the control prohibits use of the function corresponding to the information if the restart of the information processing apparatus is not permitted after displaying the screen.

5. A non-transitory storage medium storing a program for causing an information processing apparatus capable of communicating with an external apparatus, and executing a predetermined function based on a setting value managed by the external apparatus, to execute a control method, the method comprising:
    receiving a use request of a predetermined function from a user;
    acquiring information indicating a changed content of the setting value from the external apparatus when the external apparatus has changed the setting value; and
    performing control, if the use request of a function corresponding to the information has been received in a state where the information processing apparatus has not been restarted after acquiring the information, to display a screen for prompting a restart of the information processing apparatus,
    wherein performing the control prohibits use of the function corresponding to the information if the restart of the information processing apparatus is not permitted after displaying the screen.

* * * * *